No Printed Specification Available
7888X J & L. Hale,
Horse Power.
Patented Dec. 24, 1833.
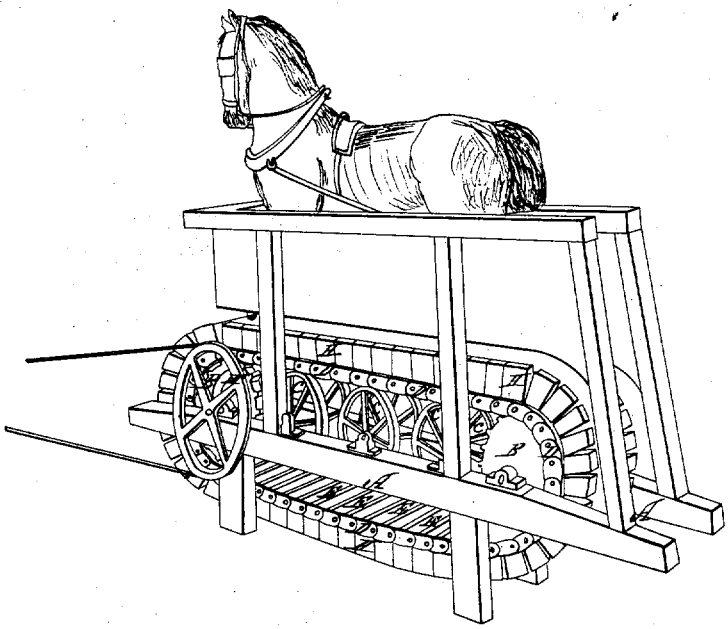
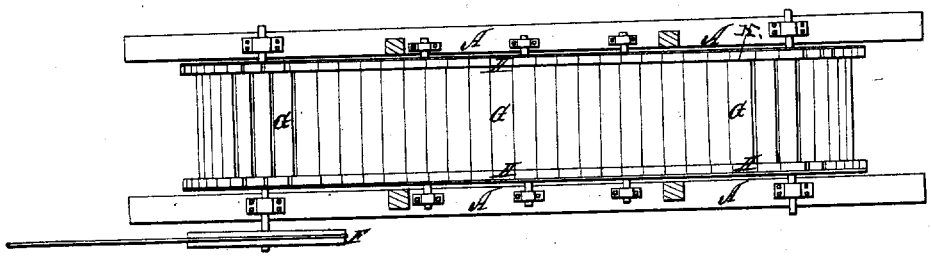
AM. PHOTO-LITHO. CO. N.Y. (OSBORNE'S PROCESS)

X7888 Dec. 24. 1833 87.

John Hale & Luke Hale, Hollis Co. New Hampshire

Letters Patent.

The Schedule referred to in these Letters Patent and making part of the same, containing a description in the words of the said John Hale and Luke Hale, themselves of their improvement in the Machine for applying animal power to propelling Machinery Boats &c.

To all whom it may concern: Be it known that we John Hale & Luke Hale, of Hollis County of Hillsborough, and State of New Hampshire, have invented an improvement in the Machine for applying Animal Power, for propelling Machinery, Boats &c. It being a portable Machine, And the following is a full and exact description of our said invention. To wit: The frame for a Machine for applying horse power is about ten feet long and twenty inches wide. on this frame is placed two horizontal shafts resting in boxes on each side of the frame, on each side of these shafts are placed two indented wheels about twenty inches in diameter, and about sixteen inches apart, and at equal distances from the centre of the Machine. These shafts are placed at equal distances from each end of the frame, and are about seven feet six inches from each other, Between these shafts are placed one or more intermediate shafts with wheels placed similarly to those above mentioned, having smooth Peripheries. These wheels are to assist in supporting two endless chains. The links of these chains are about four inches long, and put together with rods about eighteen inches long which passes from one chain to the other, each end forming a rivet for the chain, these rods are parallel with the above mentioned shafts and pass over the indented wheels which prevent the chains from slipping when power is applied to the band wheel. The band

X 7888

[illegible] wheel is placed on the end of the shaft (outside of the frame) which support to the indented wheels. An endless platform on which the horse walks is composed of boards or plank, their width corresponding with the length of the chain links. The ends of these boards or plank rest on the endless chains, on these boards or plank near each end are placed supporting blocks, the same width of said boards, and about five inches high. These blocks and boards are bolted firmly to the chains. The blocks support the platform while passing over the wheels above mentioned. When great speed is required small pinions are geared to the indented wheels which the above named rods pass over.

What we claim as our invention and for which a patent is asked is the <u>manner</u> of <u>supporting</u> the Platform and the chain.

Witnesses
Benjamin F. Farley.
Benjamin M. Farley.

John Hale
Luke Hale

Patented 24 Decr 1833
( Dr in port folio)

Exd.
[illegible]

[450 [illegible]